__United States Patent__ [19]

Brotsky et al.

[11] Patent Number: 5,069,922

[45] Date of Patent: Dec. 3, 1991

[54] PROCESS FOR TREATING POULTRY CARCASSES TO CONTROL SALMONELLAE GROWTH

[76] Inventors: Eugene Brotsky, 5453 Covode St., Pittsburgh, Pa. 15217; Frederic G. Bender, 142 Irwin Ave., Houston, Pa. 15342

[21] Appl. No.: 530,131

[22] Filed: May 29, 1990

Related U.S. Application Data

[63] Continuation of Ser. No. 308,357, Feb. 9, 1989.

[51] Int. Cl.$^5$ .......................... A23L 3/34; A23L 1/315
[52] U.S. Cl. .................................. 426/332; 426/335; 426/532; 426/644; 426/652
[58] Field of Search ................ 426/332, 335, 532, 644, 426/652

[56] References Cited

U.S. PATENT DOCUMENTS

| | | |
|---|---|---|
| 1,744,310 | 4/1929 | Bates . |
| 2,770,548 | 11/1956 | Hall et al. ............................. 99/222 |
| 2,957,770 | 10/1960 | Freund et al. ........................ 99/107 |
| 3,493,392 | 2/1970 | Swartz ................................. 99/111 |
| 3,620,767 | 11/1971 | Swartz ................................. 99/111 |
| 3,681,091 | 8/1972 | Kohl et al. ........................... 99/150 |
| 3,705,040 | 12/1972 | Bynagte .............................. 99/111 |
| 3,775,543 | 11/1973 | Zyss .................................... 426/371 |
| 3,782,975 | 1/1974 | Zyss .................................... 426/281 |
| 4,075,357 | 2/1978 | Szczesniak et al. .................. 426/332 |
| 4,342,790 | 8/1982 | Kotok et al. ......................... 426/332 |
| 4,592,892 | 6/1986 | Ueno et al. ........................... 422/28 |
| 4,683,139 | 7/1987 | Cheng ................................. 426/265 |
| 4,683,618 | 8/1987 | O'Brien ............................... 127/51 |
| 4,770,884 | 9/1988 | Hill et al. ............................. 426/332 |
| 4,849,237 | 9/1989 | Hurst .................................. 426/332 |

FOREIGN PATENT DOCUMENTS

847280 7/1970 Canada .
935413 8/1963 United Kingdom .
1339503 12/1973 United Kingdom .

OTHER PUBLICATIONS

Humphrey et al., "The Influence of Scald Water pH on the Death Rates of Salmonella Typhimurium and Other Bacteria Attached to Chicken Skin", Journal of Applied Bacteriology 1984, 57(2), pp. 355–359.

Hymphrey et al., "The Effect on pH Adjustment on the Microbiology of Chicken Scald-Tank Water with Particular Reference to the Death Rate of Salmonella", Journal of Applied Bacteriology 1981, 51, pp. 517–527.

Teotia, Chemical Pasteurization of Poultry Meat, Disseration Abstracts International B., 1974, 34 (a), 4142.

Hargreaves, The Antimicrobial Effect of Phosphate with Particular Reference to Food Products, The British Food Manufacturing Industries Research Association, Scientific and Technical Surveys, No. 76, Apr. 1972, pp. 1–2 @12.

G. Pacheco et al., Bacteriolytic Action of Phosphates, Mems Institute, Oswaldo Cruz, 52 (2), pp. 405–414.

E. Brotsky Automatic Injection of Chicken Parts with Polyphosphate, Poultry Science, 55, pp. 653–660 (1976).

Thompson et al., "Phosphate and Heat Treatment to Control Salmonella and Reduce Spoilage and Rancidity on Broiler Carcasses", *Poultry Science*, pp. 139–143, 1979.

*Primary Examiner*—Donald E. Czaja
*Assistant Examiner*—Evan Federman
*Attorney, Agent, or Firm*—Scully, Scott, Murphy & Presser

[57] ABSTRACT

Salmonellae and other bacteria can be removed, reduced or retarded on poultry carcasses by treating eviscerated and defeathered poultry with a treatment solution containing an alkali metal orthophosphate, e.g., sodium, orthophosphate in combination with a basic agent, preferably sodium carbonate.

9 Claims, No Drawings

PROCESS FOR TREATING POULTRY CARCASSES TO CONTROL SALMONELLAE GROWTH

This is a continuation of copending application Ser. No. 07/308,357 filed on Feb. 9, 1989.

The present invention relates to an improved process for reducing the level of and retarding the growth of bacteria, such as salmonellae, on raw poultry without causing organoleptic depreciation thereof.

BACKGROUND OF THE INVENTION

Poultry is processed, after slaughtering, by scalding to assist in defeathering, defeathering by machine, washing, eviscerating and chilling prior to packing. These treatments are controlled to avoid causing a change in the appearance characteristics of poultry which would make it unsalable.

Poultry, after eviscerating, shows high levels of salmonella bacteria on the surface of the carcass. A large part of carcass contamination with salmonellae can be removed by water washing. While salmonellae can be easily killed by heat, such as during cooking, colony forming units of bacteria can attach and/or reside in the regular and irregular surfaces of the skin, multiply and, thereafter, contaminate working surfaces, hands and utensils. Food spoilage and illness can result from this carryover of bacteria or cross-contamination from the infected carcass to surfaces not heated sufficiently to cause thermal destruction of the bacteria.

Extensive research has been conducted by the art to uncover an economical system for reducing salmonellae contamination of poultry carcasses without causing organoleptic depreciation. Poultry feathers carry large amounts of salmonellae which can contaminate the carcass during scalding. Improper evisceration can also be a source of contamination. The use of acids such as lactic or acetic acid, at levels sufficient to effect bacteriological control, causes organoleptic deterioration of the poultry. At acid levels low enough to avoid organoleptic deterioration of the poultry, bacteriostatic effects are reduced.

A treatment system must be economical, easy to use, compatible with food manufacturing, and not change the organoleptic properties of the poultry. Any change in the appearance of the poultry would make the same unsaleable.

It has been reported that the thermal death rate of salmonellae can be increased during scalding by elevating the pH of the scald water to pH $9.0\pm0.2$. Agents such as sodium hydroxide, potassium hydroxide, sodium carbonate, and trisodium phosphate have been reported as effective pH adjusting agents for use in increasing the thermal death rate of the bacteria. Trisodium phosphate was reported as least effective in increasing the death rate. Sodium hydroxide and potassium hydroxide, while effective bacteriostats, can affect the surface of the carcass adversely. Propionic acid and glutaraldehyde, which were also tried as treating agents, are reported as possibly having unfavorable effects on plucking. See "The Effect of pH Adjustment on the Microbiology of Chicken Scald-tank Water With Particular Reference to the Death Rate of Salmonellae", T. J. Humphrey et al., Journal of Applied Bacteriology 1981, 51, pp. 517-527.

T. J. Humphrey et al. have also reviewed the pH effect of scald water on Salmonella on chicken skin. See "The Influence of Scald Water pH on the Death Rates of *Salmonella typhimurium* and Other Bacteria Attached to Chicken Skin", Journal of Applied Bacteriology 1984, 57 (2), pp. 355-359. Scald water adjusted to pH $9\pm0.2$ as in the 1981 paper can help to reduce external and internal cross-contamination of carcasses by salmonellas.

The results reported in the first article are based on assays of samples of scald water taken from the scald tank. The article does not show the effect of the agents on bacterial colonies on the surface of the poultry or the organoleptic effect on the poultry meat or skin.

The second paper teaches that pH adjustment of scald water to a pH of $9\pm0.2$ can be used to improve the hygiene of chicken carcasses during plucking by lowering the bacterial carry over from the scald tank.

These references are limited to the scald tank and do not show any long term effect of the agents on the surface of the poultry since the scald water solution and any agents therein are washed off after defeathering.

Humphrey et al. recognize that plucking and subsequent evisceration cause further contamination. The improvements in scalding hygiene reported in their 1984 paper and in their earlier work [1981] help to reduce the growth rate of pathogens on carcass surfaces during plucking but have no measurable effect on the shelf-life of safety of chilled carcasses because of further contamination during evisceration. The organisms responsible for spoilage of meat of this type are added during cold storage or during later stages of processing. (Humphrey et al. 1984 at page 359). Humphrey et al. do not teach reducing the potential for salmonellosis by reducing the incidence and population of salmonella organisms.

Humphrey et al., 1984, also do not show the organoleptic effect of their treatment on the poultry carcasses, much of which is undesirable.

Attempts have been made to pasteurize poultry meat by treating the meat with a solution containing agents such as lactic acid, acetic acid, sodium carbonate, sodium borate, sodium chloride, potassium hydroxide, chlorine and EDTA. All treatments, except sodium borate, sodium chloride, and sodium carbonate, reduced the visual acceptability of the meat. Chlorine failed to destroy bacteria on the surface of the poultry but would be expected to control salmonellae in water. See *Chemical Pasturization of Poultry Meat*, J. S. Teotia, Dissertation Abstracts Int'l. B., 1974, 34(a), 4142.

It is known that the shelf life of chicken carcasses can be increased 1 to 2 days by chilling the poultry in a solution of 6% sodium tripolyphosphate/0.7% tetrasodium pyrophosphate (Kena-available from Stauffer Chemical Company Division of Rhone-Poulenc, Inc.). See *The Antimicrobial Effect of Phosphate With Particular Reference To Food Products*, L. L. Hargreaves et al., The British Food Manufacturing Industries Research Association, Scientific and Technical Surveys, No. 76, April 1972, pages 1-20 at page 12. Many patents and articles suggest the use of polyphosphates in preserving meat and fish products.

In addition, it is also stated in the Hargreaves reference at page 7 that G. Pacheco and V. M. Dias in an article entitled *Bacteriolytic Action of Phosphates*, Mems Institute Oswaldo Cruz, 52 (2) ppg. 405-414, reported on the bacteriolytic action of solutions of monosodium, disodium, trisodium and dipotassium orthophosphates on dead and living cells of *Salmonella typhosa*, *Escherichia coli* and *Staphylococcus aureus*. Trisodium phosphate dodecahydrate is stated to have the greatest lytic action. This reference does not relate to treating poultry.

British patent 935,413 teaches treating raw poultry in the chill tank with a non-cyclic polyphosphate. It is taught that this method provides increased preservation of the poultry flesh by decreasing exudate and thereby decreasing spread of bacteria.

Trisodium phosphate has also been found to be effective in inhibiting the growth of blue mold in cuts and bruises in fruit by treating the broken surface with the solution of trisodium phosphate (U.S. Pat. No. 1,774,310).

The extensive research conducted by the art has been unsuccessful in providing a treatment to reduce salmonellae levels of poultry carcasses without causing extensive organoleptic depreciation.

The invention provides a poultry carcass wash process which removes or reduces existing salmonellae contamination as well as retards further contamination in growth without affecting the organoleptic properties of the poultry carcasses.

SUMMARY OF THE PRESENT INVENTION

In accordance with the present invention, there is provided a process for treating poultry carcasses to remove or retard bacterial growth, such as salmonellae growth, without affecting the organoleptic properties of the poultry carcasses comprising treating eviscerated and defeathered poultry at a temperature below about 27° C. with a treatment solution comprising a blend of a major amount of trialkali metal orthophosphates and a corresponding minor amount of a basic agent, said blend being present in an amount and said poultry being treated for a time sufficient to reduce bacteriological contamination of the poultry, said basic agent being present in said blend in amounts insufficient to cause substantial organoleptic depreciation of the poultry, such treatment solution having a pH above 11.5. Preferably the treatment time is longer than about 5 minutes if a dip solution application is used.

Specifically, it has been discovered that poultry can be treated with a solution containing from about 4% to about 12% trisodium or tripotassium orthophosphate dodecahydrate or an equivalent amount of the anhydrous compound. It has been found that treatment with the trisodium or tripotassium orthophosphate gave essentially the same effectiveness as sodium hydroxide or phosphoric acid/sodium hydroxide without the adverse effects on the meat or skin which accompany the use of the sodium hydroxide or phosphoric acid/sodium hydroxide blend.

By the use of this process, poultry carcasses can be washed economically and simply with food grade products to achieve salmonellae control without organoleptic depreciation of the carcass. Phosphate salts can remain on the poultry surface to provide a surface less conducive to supporting bacterial growth, particularly in the highly irregular surfaces of the skin without fear of carcass degradation or impairment of flavor.

Other benefits will become apparent from the description which follows.

DETAILED DESCRIPTION OF THE INVENTION

Trialkali metal phosphate is an orthophosphate salt of the formula $R_3PO_4$ with a formula for the sodium salt being $Na_3PO_4$ and an equivalent formula for the tripotassium compounds. R is a alkali metal of sodium or potassium. Trisodium phosphate has a minimum of 41.5% $P_2O_5$ and a typical pH in a 1% solution of about 11.8.

Trisodium phosphate is also available as the dodecahydrate of the formula:

$$Na_3PO_4 \cdot 12H_2O$$

In commerce, the dodecahydrate is available in a technical grade with a formula of:

$$5(Na_3PO_4 \cdot 12H_2O)NaOH;$$

or in the food grade with a formula of:

$$4(Na_3PO_4 \cdot 12H_2O)NaOH.$$

Both forms have a typical pH in 1% solution of 11.8. Preferably, the trisodium phosphate dodecahydrate (either form) is used. As used herein, trisodium phosphate is intended to include tripotassium phosphate as well as all forms of those compounds. Food grade products are intended to be used for food uses.

The invention is applicable to all types of poultry including chickens, turkeys, geese, capon, cornish hens, squab, ducks, guinea, fowl and pheasants. By poultry or carcass, it is intended to cover whole birds as well as parts.

After the processing of the poultry to defeather and eviscerate, the carcass is washed with water or other acceptable cleaning solutions for cleaning. Agitation, sonification and other mechanical means can be applied to assist in washing. Preferably, the carcass is then treated with a treatment solution containing from about 4% to about 12% and preferably from about 6% to about 10% by weight trialkali metal orthophosphate based on the weight of the solution. The carcasses can be dipped in the treatment solution. If so, the carcass or the solution is preferably agitated to insure a good flow of the treatment solution over all surfaces and in all crevices of the carcass. The treatment solution can also be applied by mechanical sprayers, preferably under high pressure to insure good contact and sonification at either sonic or ultrasonic frequencies. Any other means of contacting the poultry with the treatment solution, such as in a rotating drum, can also be used. The treatment can also be included in the usual chill tank treatment of the poultry. The treatment solution preferably contains only trialkali metal orthophosphate. However, the treatment solution can also contain other ingredients for preservation, water holding, cleaning, flavoring and the like.

The treatment solution is preferably comprised of trialkali metal orthophosphate. For purposes of adjusting pH, minor amounts of other agents can also be added. These can be illustrated by sodium carbonate, sodium and/or potassium hydroxide, alkali metal polyphosphates such as sodium tripolyphosphate or acids such as phosphoric acid. Since hydroxides have an adverse effect on the organoleptic characteristics of the poultry flesh, it is preferred to avoid the use of these basic agents. The basic agent, if used, is used in an amount insufficient with the alkali metal orthophosphate to cause organoleptic deterioration of the poultry flesh. By "minor amounts" is meant less than 50% by weight of the combined dry weight of the trialkali metal orthophosphate and the basic agent. Preferably, the basic agent is present in the blend in an amount ranging from about 10% to about 50% based on the dry weight of the blend.

The ingredients in the treatment solution are used in amounts sufficient to provide a pH of above about 11.5 and preferably within the range from about 11.6 to about 13.0.

The treatment is conducted under good poultry processing conditions. Cool temperatures and cool treatment solutions are used to avoid undue deterioration of the meat. The treatment solution is preferably less than 27° C., more preferably less than 10° C.

The poultry carcasses are contacted with the treatment solution for a period of time sufficient to reduce bacterial contamination over and above that obtainable with pure water. Treatment dwell time is also sufficient, under the conditions of the treatment, to contact all contactable exposed surfaces of the poultry carcasses, effect a washing of the surfaces and thus contact substantially all colony forming units on the surface of the poultry. The contact time is sufficient to allowing upon drying, the deposition of an even layer of trialkali metal orthophosphate on the exposed surfaces of the poultry to prevent or retard further bacterial growth.

At atmospheric pressure, in a dip tank, dwell times ranging from about 30 seconds to about 30 minutes have been found to be effective. Dwell times can be reduced using a pressure spray. Longer dwell times can be used if the solution concentration is not excessive.

Immediately after treatment, the poultry can be processed using usual processing conditions such as draining and chilling. A unique feature of the invention is the ability to allow the trialkali metal phosphate to dry on the surface of the poultry without the need to wash. It is therefore preferred to combine trialkali metal phosphate wash with the chill tank. The residual phosphate left on the poultry provides reduced bacteriological activity particularly in the cracks and pockets of the skin.

While the present invention is primarily directed at reducing salmonellae contamination of the poultry, it is also intended to include all bacterial growth which is affected by the stated trialkali metal orthophosphates. In addition to salmonellae, other bacteria which are measured by total plate count are significantly reduced.

Affected bacterial species can be easily determined by one of ordinary skill and thus all such bacteria as are affected are considered included in the invention.

The present invention will be illustrated in the Examples which follow. The poultry used in the Examples are conventional chicken broiler stock weighing dressed from about 0.9 to about 1.1 kilograms.

EXAMPLES 1-6

Grade A broilers from a processing plant after rinsing and before being chilled in the chill tank were packed in coolers with "$CO_2$ snow", transported, separated and placed on ice and kept in a 1.1° C. (34° F.) cooler overnight. The birds were dipped for 1 minute in an inoculum of $10^7$–$10^8$ CFU/ml of a freshly grown nalidixic acid resistant strain of *Salmonella typhimurium* harvested from BHI broth and then allowed to drain for a specific time. After the allotted draining time, 5 broilers were submerged and agitated in each treatment solution for a specified dwell time. Each agent was placed in a separate tared clean plastic container. Water and ice were added until 20.4 kilograms was obtained with a temperature of approximately 7.2° C. (45° F.). One inoculated broiler was immersed in water as control and one inoculated bird was retained without washing as a control.

After treatment, the birds were individually placed in Cryovac plastic bags and were either analyzed immediately (two birds plus the inoculated control) or placed in a 2.2° C. (36° F.) incubator to determine the effect of treatment after storage. Two broilers were analyzed for each treatment after 5 and 8 days storage at 2.2° C. (36° F.). Thus seven birds were used for each treatment. The following conditions were used:

TABLE I

| Example | Treatment Agent | Amount /20.4 Kg | Inoculum Drain Time | Treatment Dwell Time |
|---|---|---|---|---|
| 1 | $Na_3PO_4$ | 2.4 kg | 2 minutes | 30 seconds |
| 2 | $Na_3PO_4$ | 0.78 kg | 1 hour | 15 minutes |
| 3 | $Na_3PO_4$ | 1.6 kg | 2 minutes | 15 minutes |
| 4 | $Na_3PO_4$ | 1.59 kg | 1 hour | 15 minutes |
| 5 | 50% $Na_3PO_4$ 50% STP | 1.59 kg | 1 hour | 15 minutes |
| 6 | Water | 0.0 | 2 minutes | 15 minutes |

*STP means sodium tripolyphosphate

ENUMERATION OF NALIDIXIC ACID-RESISTANT SALMONELLA

Nalidixic acid-resistant salmonellae were enumerated using the whole carcass wash procedure as prescribed by the National Broiler Council. Each bird was weighed and the resulting weight was divided by 3.8 to determine the number of ml of lactose broth plus 0.6% tergitol to be added to the bag. The bird, broth, and bag were shaken for 1 minute through an arc of 2 ft in a manner assuring that the broth flowed through the abdominal cavity and over the entire surface of the carcass. Serial dilutions of this broth in Butterfield's buffer were plated using the pour plate procedure with MacConkey's agar with 100 ppm nalidixic acid added. These plates were incubated for 48 hours at 35° C. then counted. Nalidixic acid-resistant colonies were selected and confirmed as Salmonella using FDA Bacteriological Analytical Manual (BAM) Procedures.

As a backup procedure to assure recovery of sublethally injured nalidixic acid-resistant salmonellae, a 10 ml aliquot of the lactose broth, 0.6 percent tergitol carcass wash was pipetted into a sterile culture tube and incubated for 24 hours at 35° C. In the event that no growth occurred on the MacConkey Agar/nalidixic acid plates, the backup wash was examined for the presence of salmonellae using FDA BAM procedures.

The results achieved are shown in Table II which follows. The data for storage at 2.2° C. (36° F.) for 0, 5 and 8 days is compared to an inoculated control which has been washed only with water.

TABLE II

Efficacy[a] of Treatments of Examples 1 through 6 against a nalidixic acid-resistant *Salmonellae typhimurium* inoculated onto fresh broiler carcasses.

| | 2.2 (36° F.) Storage Time (Days) | | Duplicate A | Duplicate B | Mean CFU per ml[a] | Log CFU per ml | Pct. Reduction |
|---|---|---|---|---|---|---|---|
| | | | \multicolumn{2}{c}{CFU per ml[a] Duplicates} | | | |
| Example 1 | 0 | a | $1.9 \times 10^5$ | $7.7 \times 10^2$ | $8.4 \times 10^4$ | 4.92 | 99.2 |
| | | b | $6.8 \times 10^4$ | $1.0 \times 10^3$ | | | |
| | 5 | a | $9.2 \times 10^3$ | $6.4 \times 10^3$ | $7.4 \times 10^3$ | 3.87 | 99.9 |
| | | b | $8.2 \times 10^3$ | $5.6 \times 10^3$ | | | |
| | 8 | a | $8.1 \times 10^3$ | $9.0 \times 10^3$ | $8.1 \times 10^3$ | 3.91 | 99.9 |
| | | b | $8.7 \times 10^3$ | $6.4 \times 10^3$ | | | |
| Untreated Control | — | — | $1.0 \times 10^7$ | $1.1 \times 10^7$ | $1.1 \times 10^7$ | 7.04 | — |
| Example 2 | 0 | a | $9.0 \times 10^1$ | $7.0 \times 10^4$ | $6.3 \times 10^4$ | 4.80 | 99.5 |
| | | b | $5.0 \times 10^1$ | $1.8 \times 10^5$ | | | |
| | 5 | a | $2.0 \times 10^4$ | $9.6 \times 10^3$ | $1.4 \times 10^4$ | 4.14 | 99.9 |
| | | b | $1.9 \times 10^4$ | $6.4 \times 10^3$ | | | |
| | 8 | a | $7.8 \times 10^3$ | $2.2 \times 10^4$ | $1.6 \times 10^4$ | 4.19 | 99.9 |
| | | b | $7.7 \times 10^3$ | $2.5 \times 10^4$ | | | |
| Untreated Control | — | — | $1.2 \times 10^7$ | $1.2 \times 10^7$ | $1.2 \times 10^7$ | 7.08 | — |
| Example 3 | 0 | a | $1.0 \times 10^2$ | $1.3 \times 10^2$ | $8.3 \times 10^1$ | 1.92 | 99.999 |
| | | b | $3.0 \times 10^1$ | $7.0 \times 10^1$ | | | |
| | 5 | a | $5.7 \times 10^2$ | $1.4 \times 10^3$ | $2.4 \times 10^3$ | 3.38 | 99.98 |
| | | b | $3.8 \times 10^2$ | $7.2 \times 10^3$ | | | |
| | 8 | a | $2.2 \times 10^3$ | $3.3 \times 10^3$ | $3.2 \times 10^3$ | 3.51 | 99.98 |
| | | b | $1.9 \times 10^3$ | $3.3 \times 10^3$ | | | |
| Untreated Control | — | — | $1.5 \times 10^7$ | $1.5 \times 10^7$ | $1.5 \times 10^7$ | 7.18 | — |
| Example 4 | 0 | a | $2.0 \times 10^1$ | $1.8 \times 10^2$ | $8.5 \times 10^1$ | 1.93 | 99.999 |
| | | b | $6.0 \times 10^1$ | $8.0 \times 10^1$ | | | |
| | 5 | a | $2.1 \times 10^3$ | $8.8 \times 10^3$ | $3.4 \times 10^3$ | 3.53 | 99.98 |
| | | b | $2.6 \times 10^3$ | $1.2 \times 10^2$ | | | |
| | 8 | a | $9.0 \times 10^2$ | $1.8 \times 10^3$ | $1.3 \times 10^3$ | 3.11 | 99.99 |
| | | b | $1.1 \times 10^3$ | $1.3 \times 10^3$ | | | |
| Untreated Control | — | — | $1.9 \times 10^7$ | $1.3 \times 10^7$ | $1.6 \times 10^7$ | 7.20 | — |
| Example 5 | 0 | a | $3.0 \times 10^1$ | $6.0 \times 10^1$ | $3.3 \times 10^1$ | 1.51 | 99.999 |
| | | b | $1.0 \times 10^1 (+)$ | $4.0 \times 10^1$ | | | |
| | 5 | a | $2.1 \times 10^3$ | $4.3 \times 10^3$ | $2.6 \times 10^3$ | 3.41 | 99.98 |
| | | b | $1.6 \times 10^3$ | $2.4 \times 10^3$ | | | |
| | 8 | a | $2.0 \times 10^3$ | $4.9 \times 10^2$ | $1.2 \times 10^3$ | 3.08 | 99.99 |
| | | b | $1.9 \times 10^3$ | $4.1 \times 10^2$ | | | |
| Untreated Control | — | — | $1.0 \times 10^7$ | $1.1 \times 10^7$ | $1.1 \times 10^7$ | 7.04 | — |
| Example 6 (Control) | 0 | a | $7.9 \times 10^5$ | $5.9 \times 10^5$ | $7.4 \times 10^5$ | 5.87 | 90.9 |
| | | b | $1.0 \times 10^6$ | $5.7 \times 10^5$ | | | |
| | 5 | a | $4.1 \times 10^5$ | $6.5 \times 10^5$ | $5.2 \times 10^5$ | 5.72 | 93.6 |
| | | b | $4.3 \times 10^5$ | $5.9 \times 10^5$ | | | |
| | 8 | a | $3.1 \times 10^5$ | $4.0 \times 10^5$ | $4.0 \times 10^5$ | 4.60 | 95.1 |
| | | b | $4.3 \times 10^5$ | $4.5 \times 10^5$ | | | |
| Untreated Control | — | — | $5.2 \times 10^6$ | $1.1 \times 10^7$ | $8.1 \times 10^6$ | 6.91 | — | a = Colony Forming Units per ml of carcass wash.
(+) Back up confirmed positive for nalidixic acid-resistant salmonellae.

DISCUSSION OF RESULTS

The inoculum suspension averaged $1.6 \times 10^8$ CFU per ml nalidixic acid-resistant *Salmonella typhimurium*. Uninoculated, untreated control broilers averaged 380 nalidixic acid-resistant salmonellae per ml. This number is considered insignificant in light of the inoculum level used in the experiment. Untreated inoculated controls averaged $1.2 \times 10^7$ CFU per ml nalidixic acid-resistant salmonellae.

Treatment of inoculated carcass with water wash only (Example 6) gave reductions of 90.9 to 95.1 percent (approximately 1 log-cycle). Therefore, the water rinse by itself removed approximately 90 percent of the nalidixic acid-resistant salmonellae.

The treatments of Examples 1 and 2 both gave reductions in the 99 to 99.9 percent range (2 to 3 log cycles). Thus the higher concentration and short dwell time of the treatment of Example 1 was approximately equivalent to the lower concentration longer dwell time of the treatment of Example 2.

The treatments of Examples 3 and 4 both gave 99.999 percent (5 log-cycle) reductions immediately after treatment (Time 0) as compared to inoculated untreated controls. However, reductions were 99.98 or 99.99 (approximately 4 log cycles) for samples stored for 5 or 8 days at 3.3° C. (38° F.). This may indicate that injured cells not recovered by plating immediately after treatment may be able to effect repair during refrigerated storage. The increased recovery numbers do not indicate growth since salmonellae will not grow at temperatures less than 7.2° C. (45° F.).

The treatment of Example 5 gave a reduction of 99.9998 (nearly 6 log-cycles) immediately after treatment. Again, there was increased recovery of nalidixic acid-resistant salmonellae at 5 and 8 days compared to immediately after treatment.

EXAMPLES 7-13

Broilers randomly selected from the chill tank and transported on wet ice were treated as in Example 1. Seven treating solutions were prepared, 3 as per the invention and 4 controls. Eleven chickens were dipped at one time in the inoculum for 1 minute and allowed to drain for a specific time. Ten of these broilers were submerged in a specific agent for the time given in Table III. One inoculated broiler was retained as an inoculated untreated control. The birds were placed in Cryovac bags and stored as in Example 1. Duplicate broilers were analyzed for each treatment after 5 and 7 days storage at 2.2° C. (36° F.) and after 3 and 5 days storage at 12.8° C. (55° F.). Enumeration of salmonellae was as described in Example 1. The following conditions were used:

TABLE III

| Example | Treatment Agent | Amount /20.4 Kg | Conc. | Inoculum Drain Time | Treatment Dwell Time (Minute) |
|---|---|---|---|---|---|
| 7 | $Na_3PO_4$ | 2.45 kg | 12% | 2 Minutes | 2 |
| 8 | $Na_3PO_4$ | 1.6 kg | 8% | 1 Hour | 15 |
| 9 | $Na_3CO_3$ | 1.6 kg | 8% | 1 Hour | 15 |
| 10 | NaOH | 0.2 kg | 1% | 1 Hour | 15 |
| 11* | 75% $H_3PO_4$ | 0.54 kg | 2.6% | 1 Hour | 7.5 |
|  | 25% NaOH | 0.41 kg | 2% | 1 Hour | 7.5 |
| 12* | 75% $H_3PO_4$ | 0.54 kg | 2.6% | 1 Hour | 7.5 |
|  | 25% $Na_2CO_3$ | 1.63 kg | 8% | 1 Hour | 7.5 |
| 13 | Water | — | — | 2 Minutes | 15 |

*Examples 11 and 12 were run using two separate baths and two separate dwell times as listed.

The results are shown in Table IV

TABLE IV

Efficacy of treatments of Examples 7 through 13 against a nalidixic acid-resistant *Salmonella typhimurium* inoculated onto fresh broiler carcasses held at 2.2° C.

| Treatment | 2.2° C. Storage Time (Days) | | Replicates B | Mean CFU per ml | Log CFU per ml | Pct. Reduction |
|---|---|---|---|---|---|---|
|  |  | CFU per ml$^a$ | | | | |
| Example 7 | 0 | $2.05 \times 10^3$ | $1.21 \times 10^3$ | $1.6 \times 10^3$ | 3.20 | 99.997 |
|  | 5 | $3.35 \times 10^5$ | $6.85 \times 10^4$ | $2.0 \times 10^5$ | 5.30 | 99.69 |
|  | 7 | $1.35 \times 10^4$ | $5.5 \times 10^3$ | $9.5 \times 10^3$ | 3.98 | 99.985 |
| Untreated Control | 0 | $6.45 \times 10^7$ | — | $6.5 \times 10^7$ | 7.81 |  |
| Example 8 | 0 | $3.15 \times 10^2$ | $7 \times 10^1$ | $1.92 \times 10^2$ | 2.28 | 99.9993 |
|  | 5 | $1.9 \times 10^5$ | $0 \times 10^2$ | $1.9 \times 10^5$ | 5.28 | 99.366 |
|  | 7 | $3.9 \times 10^6$ | $1.75 \times 10^6$ | $2.83 \times 10^6$ | 6.45 | 90.66 |
| Untreated Control | 0 | $3.0 \times 10^7$ | — | $3.0 \times 10^7$ | 7.48 |  |
| Example 9 | 0 | $6.3 \times 10^3$ | $3.8 \times 10^2$ | $3.3 \times 10^3$ | 3.52 | 99.991 |
|  | 5 | $4.4 \times 10^3$ | $7.5 \times 10^2$ | $2.6 \times 10^3$ | 3.41 | 99.993 |
|  | 7 | $1.5 \times 10^1$ | $2.6 \times 10^2$ | $1.4 \times 10^2$ | 2.14 | 99.9996 |
| Untreated Control | 0 | $3.75 \times 10^7$ | — | $3.8 \times 10^7$ | 7.57 |  |
| Example 10 | 0 | $7.0 \times 10^1$ | $4.25 \times 10^2$ | $2.5 \times 10^2$ | 2.39 | 99.9997 |
|  | 5 | $2.75 \times 10^7$ | $8.4 \times 10^7$ | $5.6 \times 10^7$ | 7.75 | 42.27 |
|  | 7 | $8.95 \times 10^4$ | $3.75 \times 10^6$ | $1.9 \times 10^6$ | 6.28 | 98.04 |
| Untreated Control | 0 | $9.7 \times 10^7$ | — | $9.7 \times 10^7$ | 7.99 | — |
| Example 11 | 0 | $1.0 \times 10^1$ | $6 \times 10^1$ | $3 \times 10^1$ | 1.477 | 99.999 |
|  | 5 | $-1.34 \times 10^7$ | $4.1 \times 10^7$ | $2.7 \times 10^7$ | 7.43 | 35.71 |
|  | 7 | $1.35 \times 10^3$ | $5.45 \times 10^3$ | $3.4 \times 10^3$ | 3.53 | 99.9919 |
| Untreated Control | 0 | $4.2 \times 10^7$ | — | $4.2 \times 10^7$ | 7.62 | — |
| Example 12 | 0 | $5.55 \times 10^3$ | $1.7 \times 10^3$ | $3.6 \times 10^3$ | 3.56 | 99.987 |
|  | 5 | $1.6 \times 10^6$ | $1.35 \times 10^6$ | $1.5 \times 10^6$ | 6.19 | 94.83 |
|  | 7 | $1.3 \times 10^3$ | $3.7 \times 10^5$ | $1.9 \times 10^5$ | 5.27 | 99.34 |
| Untreated Control | 0 | $2.85 \times 10^7$ | — | $2.9 \times 10^7$ | 7.45 | — |
| Example 13 | 0 | $4.0 \times 10^6$ | $1.25 \times 10^6$ | $2.6 \times 10^6$ | 6.42 | 92.777 |
|  | 5 | $1.55 \times 10^8$ | $1.65 \times 10^8$ | $1.6 \times 10^8$ | 8.20 | No reduction |
|  | 7 | $2.05 \times 10^6$ | $8.65 \times 10^5$ | $1.5 \times 10^6$ | 6.16 | 95.83 |
| Untreated Control | 0 | $3.6 \times 10^7$ | — | $3.6 \times 10^7$ | 7.56 | — |

The untreated controls were prepared by dipping the carcass in inoculum and draining for the same period as the treated sample. The enumeration of nalidixic acid-resistant salmonellae was conducted without storage.

TABLE V

Percentage reductions of nalidixic acid-resistant salmonellae due to various treatments[1] followed by storage at 2.2° C. for 0, 5, and 7 days. Compiled from Table IV.

| Time (Days) | 0 | 0 | 0 | 0 | 0 | 0 | 0 |
|---|---|---|---|---|---|---|---|
| Example | 10 | 8 | 11 | 7 | 9 | 12 | 13 |
| Pct. Reduction | 99.9997 | 99.9993 | 99.9990 | 99.997 | 99.991 | 99.987 | 92.777 |
| Time (Days) | 5 | 5 | 5 | 5 | 5 | 5 | 5 |
| Example | 9 | 7 | 8 | 12 | 10 | 11 | 13 |
| Pct. Reduction | 99.993 | 99.69 | 99.366 | 94.83 | 42.27 | 35.71 | — |
| Time (Days) | 7 | 7 | 7 | 7 | 7 | 7 | 7 |
| Example | 9 | 11 | 7 | 12 | 10 | 13 | 8 |
| Pct. Reduction | 99.9996 | 99.9919 | 99.985 | 99.34 | 98.04 | 95.83 | 90.66 |

[1]Treatments listed in descending order of effectiveness for a given storage time.

TABLE VI

Efficacy of treatments of Examples 7 through 13 against a nalidixic acid-resistant *Salmonella typhimurium* inoculated onto fresh broiler carcasses held at 12.8° C.

| Example | 12.8° C. Storage Time (Days) | Replicates Mean of 2 dup. CFU per ml | | Mean CFU per ml | Log CFU per ml | Pct Reduction |
|---|---|---|---|---|---|---|
| 7 | 3 | $2.9 \times 10^5$ | $2.9 \times 10^5$ | $2.9 \times 10^5$ | 5.46 | 99.55 |
|   | 5 | $6.85 \times 10^2$ | $2.45 \times 10^6$ | $1.2 \times 10^6$ | 6.09 | 98.15 |
| 8 | 3 | $6.95 \times 10^4$ | $1.9 \times 10^4$ | $4.4 \times 10^4$ | 4.65 | 99.85 |
|   | 5 | $1.02 \times 10^6$ | $2.05 \times 10^2$ | $5.1 \times 10^5$ | 5.71 | 98.3 |
| 9 | 3 | $2.35 \times 10^2$ | $3.95 \times 10^4$ | $2.0 \times 10^4$ | 4.30 | 99.947 |
|   | 5 | $1 \times 10^1$ | $1 \times 10^1$ | $1.0 \times 10^1$ | 1 | 99.999 |
| 10 | 3 | $1.11 \times 10^6$ | $2.7 \times 10^6$ | $1.9 \times 10^6$ | 6.28 | 98.04 |
|    | 5 | $4.57 \times 10^3$ | $1.9 \times 10^5$ | $9.7 \times 10^4$ | 4.99 | 99.9 |
| 11 | 3 | $3.65 \times 10^6$ | $2.45 \times 10^6$ | $3.1 \times 10^6$ | 6.48 | 92.62 |
|    | 5 | $7.95 \times 10^3$ | $8.55 \times 10^2$ | $4.4 \times 10^3$ | 3.64 | 99.989 |
| 12 | 3 | $2.3 \times 10^4$ | $6.0 \times 10^5$ | $3.1 \times 10^5$ | 5.49 | 98.93 |
|    | 5 | $6.3 \times 10^2$ | $3.95 \times 10^2$ | $5.1 \times 10^2$ | 2.71 | 99.998 |
| 13 | 3 | $6.7 \times 10^6$ | $5.85 \times 10^6$ | $6.3 \times 10^6$ | 6.80 | 82.5 |
|    | 5 | $2.5 \times 10^6$ | $1.1 \times 10^7$ | $6.75 \times 10^6$ | 6.83 | 81.1 |

TABLE VII

Percentage reductions [1] of nalidixic acid-resitant salmonellae due to various treatments[2] followed by storage at 12.8° C. Compiled from Tables IV and VI

| Time (Days) | 0 | 0 | 0 | 0 | 0 | 0 | 0 |
|---|---|---|---|---|---|---|---|
| Example | 10 | 8 | 11 | 7 | 9 | 12 | 13 |
| Pct. Reduction | 99.9997 | 99.9993 | 99.9990 | 99.997 | 99.991 | 99.987 | 92.777 |
| Time (Days) | 5 | 5 | 5 | 5 | 5 | 5 | 5 |
| Example | 9 | 8 | 7 | 12 | 10 | 11 | 13 |
| Pct. Reduction | 99.947 | 99.85 | 99.55 | 98.93 | 98.04 | 92.62 | 82.5 |
| Time (Days) | 7 | 7 | 7 | 7 | 7 | 7 | 7 |
| Example | 9 | 12 | 11 | 10 | 8 | 7 | 13 |
| Pct. Reduction | 99.999 | 99.998 | 99.989 | 99.90 | 98.3 | 98.15 | 81.10 |

[1]Treatments listed in descending order of effectiveness for a given storage time.
[2]Zero time data is listed in Table IV. Data for 3 and 5 days storage at 12.8° C. is listed in Table VI.

DISCUSSION OF RESULTS

For Example 7-13, untreated inoculated controls averaged $4.8 \times 10^7$ CFU nalidixic acid-resistant *Salmonella typhimurium* per ml of carcass wash (Table IV). No nalidixic acid-resistant salmonellae were detected in uninoculated, untreated controls (not listed).

Table IV lists results of enumeration of nalidixic acid-resistant salmonellae from carcass rinse solutions for inoculated broilers subjected to the seven test treatments at 0 days storage and at 5 and 7 days storage at 2.2° C. Table V lists the percent reduction in numbers of nalidixic acid-resistant *Salmonella typhimurium* for each treatment in order of greatest effectiveness at a given storage time (0, 5, or 7 days) at 2.2° C. At time 0, treatments of Examples 10, 8 and 11 were most effective immediately producing 99.9997, 99.9993, and 99.9990 percent reductions, respectively. However, at day 5 the percent reduction for the treatments of Examples 10, 8 and 11 were 42.27, 99.366, and 35.71, respectively. At day 7, the percentage reductions were 98.04, 90.66 and 99.9919, respectively, for the treatments of Example 10, 8 and 11. These observations reflect recovery of sublethally injured cells during refrigerated storage rather than outgrowth of salmonellae during refrigerated storage at 2.2° C.

Table VI lists results of enumeration of nalidixic acid-resistant salmonellae from carcass rinse solutions for inoculated broilers subjected to the 7 treatments, then subsequently stored at 12.8° C. for 3 or 5 days. Initial (day 0) counts are listed in Table IV. The percentage reductions from Table VII for carcasses stored at 12.8° C. are listed in Table VII together with the initial (day 0) reduction from Table IV to facilitate comparison. Note that the recovery of injured cells observed at 2.2° C. also occurs at 12.8° C. Again, no growth is evident during the time period of this study, even at the 12.8° C. storage temperature, which reflects moderate to severe temperature abuse.

One important situation not reflected in the microbiological data is the fact that for the sodium hydroxide treatments of Examples 10 and 11, severe sloughing of broiler skin occurred, resulting in a very unacceptable appearance. Both of these treatments are undesirable for commercial use.

The treatments of Examples 7 and 8, both of which involved the use of $Na_3PO_4 \cdot 12H_2O$, were essentially as effective as the treatments of Examples 10 (sodium hydroxide) and 11, (phosphoric acid and sodium hydroxide) without the accompanying adverse effects on appearance of the broiler carcasses. The treatments of Examples 7 and 8 involving the use of $Na_3PO_4 \cdot 12H_2O$ gave an approximately one log cycle greater kill initially than did the treatments of Examples 9 ($Na_2CO_3$) and 12 (75% $H_3PO_4$)/$Na_2CO_3$, both of which involved the use of $Na_2CO_3$. However, the percent reduction for the treatment of Example 9 ($Na_2CO_3$) increased with storage at 2.2° C., so that had the greatest percent reduction after 5 and 7 days storage at 2.2° C. of any of the 7 treatments (Table V). These trends were essentially the same for the studies conducted at 12.8° C.

Trisodium phosphate either alone or in combination seem to have great potential for use in eliminating salmonellae from poultry carcasses.

What is claimed is:

1. A process for treating poultry carcasses comprising contacting eviscerated and defeathered poultry with a treatment solution having a pH above about 11.5 and containing trialkali metal orthophosphate being present in an amount of from about 4% to about 12% based on the weight of the solution, for a period of time effective to remove, reduce or retard salmonella bacterial contamination and insufficient to cause organoleptic depreciation of the poultry.

2. The process of claim 1 wherein the amount of phosphate is about 8% to about 12% based on the weight of the solution.

3. A process as recited in claim 1 wherein said orthophosphate is trisodium orthophosphate.

4. A process as recited in claim 1 wherein said pH ranges from about 11.6 to about 13.0.

5. A process as recited in claim 1 wherein residual phosphate is left on the poultry to provide reduced bacterial activity on the surface of the poultry.

6. A process as recited in claim 1 wherein said poultry is treated at a temperature equal to or less than about 27° C.

7. A process as recited in claim 5 wherein said poultry is treated at a temperature equal to or less than 10° C.

8. The process of claim 1 in which a major amount of trialkali metal orthophosphate effective to reduce bacterial contamination of poultry is combined with a minor amount of basic agent present in amounts insufficient to cause organoleptic depreciation of the poultry, said basic agent being selected from the group consisting of sodium hydroxide, potassium hydroxide, sodium carbonate, potassium carbonate, sodium tripolyphosphate and mixtures thereof.

9. A process as recited in claim 6 wherein the treated poultry is not washed after treatment whereby residual phosphate left on the poultry provides reduced bacterial activity on the surface of the poultry.

* * * * *